(12) United States Patent
Daniel

(10) Patent No.: US 9,161,206 B1
(45) Date of Patent: Oct. 13, 2015

(54) SECURE GLOBAL MOBILE DEVICE AND HOME BASE STATION

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 351 days.

(21) Appl. No.: 13/689,562

(22) Filed: Nov. 29, 2012

Related U.S. Application Data

(63) Continuation-in-part of application No. 13/675,960, filed on Nov. 13, 2012, now Pat. No. 8,787,879.

(60) Provisional application No. 61/564,820, filed on Nov. 29, 2011.

(51) Int. Cl.
*H04W 88/02* (2009.01)
*H04W 8/08* (2009.01)

(52) U.S. Cl.
CPC .................................. *H04W 8/082* (2013.01)

(58) Field of Classification Search
USPC ........ 455/413, 432.1, 432.2, 435, 445, 550.1, 455/557, 558, 575.1
See application file for complete search history.

(56) References Cited

U.S. PATENT DOCUMENTS

2003/0157938 A1* 8/2003 Haase et al. .................. 455/445
2011/0294472 A1* 12/2011 Bramwell et al. ............ 455/413

* cited by examiner

*Primary Examiner* — Thanh Le
(74) *Attorney, Agent, or Firm* — Alberto Interian, III, Esq.

(57) ABSTRACT

A system that includes at least one first mobile communications device operative to connect to a global communications network via a local wireless communications network, at least one second mobile communications device operative to connect to a mobile communications network, and at least one home base station, operative to connect to the global communications network, and to connect to the at least one second mobile communications device.

22 Claims, 5 Drawing Sheets

SECURE GLOBAL MOBILE DEVICE AND HOME BASE STATION

FIELD

The present disclosure relates generally to electronics systems, and more specifically to global communications systems and devices for connecting thereto.

PRIORITY DATA

This patent application is a non-provisional continuation-in-part patent application and claims priority under 35 U.S.C. §119(e) to: U.S. Provisional Patent Application Ser. No. 61/564,820, titled Secure Global Mobile Phone, filed Nov. 29, 2011, by Isaac S. Daniel, and is a Continuation-in-Part of U.S. Non-Provisional patent application Ser. No. 13/675,960, titled Multiple SIM Card Secure Global Mobile Device, filed on Nov. 13, 2012, by Isaac S. Daniel, which is a non-provisional of U.S. Provisional Patent Application Ser. No. 61/564,820, titled Secure Global Mobile Phone, filed Nov. 29, 2011, by Isaac S. Daniel, all of which are hereby incorporated by reference as if fully stated herein.

BACKGROUND

As globalization continues to grow, people, including businessmen, politicians, and others are required to travel internationally at an increasing rate. While in foreign countries, especially on business trips, people are required to stay connected with their co-workers, and be able to receive calls and e-mails.

Accordingly, many people purchase secondary, international, phones while traveling abroad, or purchase international SIM cards for use in their phones while traveling abroad. This allows people to communicate with their friends, family, and co-workers, and access the internet and e-mail as well when data plans are purchased. The issue with these solutions is that people must adopt a new phone number while traveling in the country, and those numbers change when they travel from country to country. If users would like to retain use of their domestic, normal phone number, then they must pay high roaming and international fees.

SUMMARY OF THE INVENTION

The various embodiments of systems and methods described herein result from the realization that global usage of mobile phones may be made easier and more secure by providing a system and method related to a mobile phone have multiple SIM cards, including a domestic SIM card and an international SIM card.

DETAILED DESCRIPTION OF PREFERRED EMBODIMENTS

Figure 1:
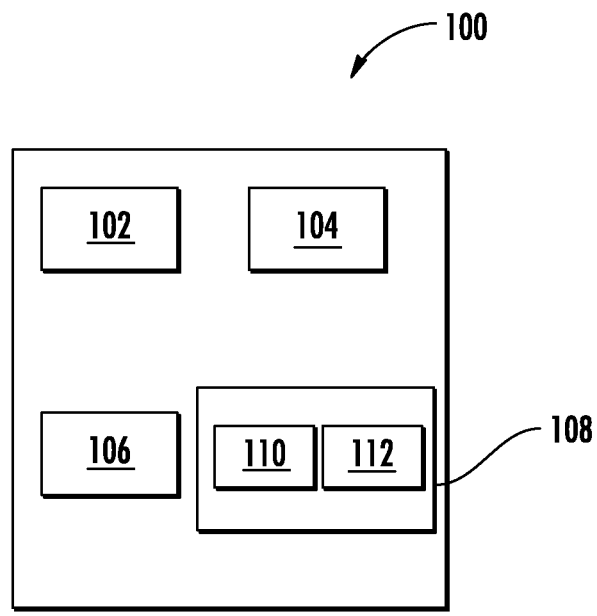
FIG. 1 shows a system in accordance with one embodiment.

FIG. 1 shows a system 100 in accordance with one embodiment, wherein system 100 comprises at least one processor 102, at least one display means 104 electronically connected to at least one processor, at least one communications means 106 electronically connected to at least one processor 102, wherein said communications means 106 is operative to connect to a wireless communications network, at least one means 108 for accepting at least two subscriber identification modules, and computer executable instructions (not shown), operative to determine whether at least one local subscriber identification module 110 and at least one global subscriber identification module 112 are present in the at least one means for accepting at least two subscriber identification modules 108, wherein the at least one local subscriber identification module 110 is assigned to a traditional phone number and the at least one global subscriber identification module 112 is assigned to a unique global phone number; receive or transmit communications to or from the traditional phone number and the unique global phone number if both the at least one local subscriber identification module 110 and the at least one global subscriber identification module 112 are present in the at least one means for accepting at least two subscriber identification modules; and prevent any communications to or from the unique global phone number if the at least one local subscriber identification module 110 is not present in the at least one means for accepting at least two subscriber identification modules 108.

In some embodiments, at least one processor 102 may be any type of processor, including a single or multi core processor. At least one display 104 may be any display device, including, but not limited to, an electronic display device, such as a liquid crystal display, a plasma display, or a light emitting diode display. In some embodiments, at least one display device 104 may comprise of a touch-screen. In some embodiments, display device 104 is electronically connected to processor 102. In other embodiments, display device 104 is wirelessly connected to processor 104. In yet further embodiments, display device 104 may include control or user input means, such as, but not limited to, a touch screen, a stylus, and the like.

At least one communications means 106 may be any type of communications means, including, but not limited to, a wireless communications means or wired communications means, such as a GSM modem, a WiFi module, a Bluetooth module, a Zigbee module, and any other type of communications means used to communicate directly with another device, or indirectly with another device, such as through a local or wide area network.

In yet another embodiment, system 100 may comprise at least one mobile device, which houses at least one processor 102, at least one display device 104, and at least one communications means 106. The mobile device may be a mobile phone, a tablet PC, a mobile PC, a smart phone, or a standalone mobile device, and the like.

In yet another embodiment, at least one communications means 106 comprises a communications means for accessing a cellular network, such as a GSM network, a data network, such as a local data network, or a wide area data network, such as the internet. In yet another embodiment, at least one communications means 106 comprises a communications means for accessing a web-enabled device, such as a Bluetooth module for accessing a web-enabled smartphone.

In another embodiment, at least one means 108 for accepting at least two subscriber identification modules may comprise a traditional subscriber identification module (SIM) card tray, or multiple SIM card tray, such as a dual-SIM card tray. In some embodiments, local and global SIM cards 110, 112 may comprise traditional SIM cards, micro SIM cards, nano SIM cards, or any other type of subscriber identification module known in the art.

In some embodiments, at least one processor 102 is connected to or integrated into a mobile communications device, such as a mobile phone. In some embodiments, the computer executable instructions may be stored locally, in whole or in part, such as in the mobile communications device. In other embodiments, the computer executable instructions may be stored remotely, in whole or in part, such as in a central station. The central station may be a cellular telephone/data service provider. The computer executable instructions may take the form of a downloadable application, such as, but not limited to a mobile application.

In some embodiments, a user may be provided with at least one local or global SIM card, as well as access to a downloadable application. In another embodiment, the user may be provided access, or rights to purchase, the downloadable application, and upon purchasing, downloading, or accessing the application, may be provided a local and/or global SIM card.

In some embodiments, the traditional phone number comprises a traditional already existing country code, area code, and city number. The unique global phone number comprises a new unique telephone number, which is not assigned to any country, region, state, or city. By having such as new and unique telephone number, a user of said telephone number may benefit from privacy protection and identity theft protection, because their place of residency may not be ascertained. Furthermore, by having both a local phone number and a unique global phone number, a user of said phone numbers may use the permanent local phone number when residing in a home territory, and may use the permanent unique global phone number when traveling abroad. A user of said telephone numbers may give their local number to people they trust, while at the same time being able to give untrusted contacts the unique global phone number, which is untraceable and not tied to any sensitive information, such as bank accounts, credit card accounts, passports, and the like. Often times while traveling abroad, identities are stolen. By being able to provide a unique telephone number that is not tied to any sensitive accounts or data, the likelihood of identity theft occurring is lessened.

Furthermore, by requiring that both the local SIM card 110 and the global SIM card 112 be present in order to use system 100 to communicate, a user is authenticated and security is heightened.

Figure 3:
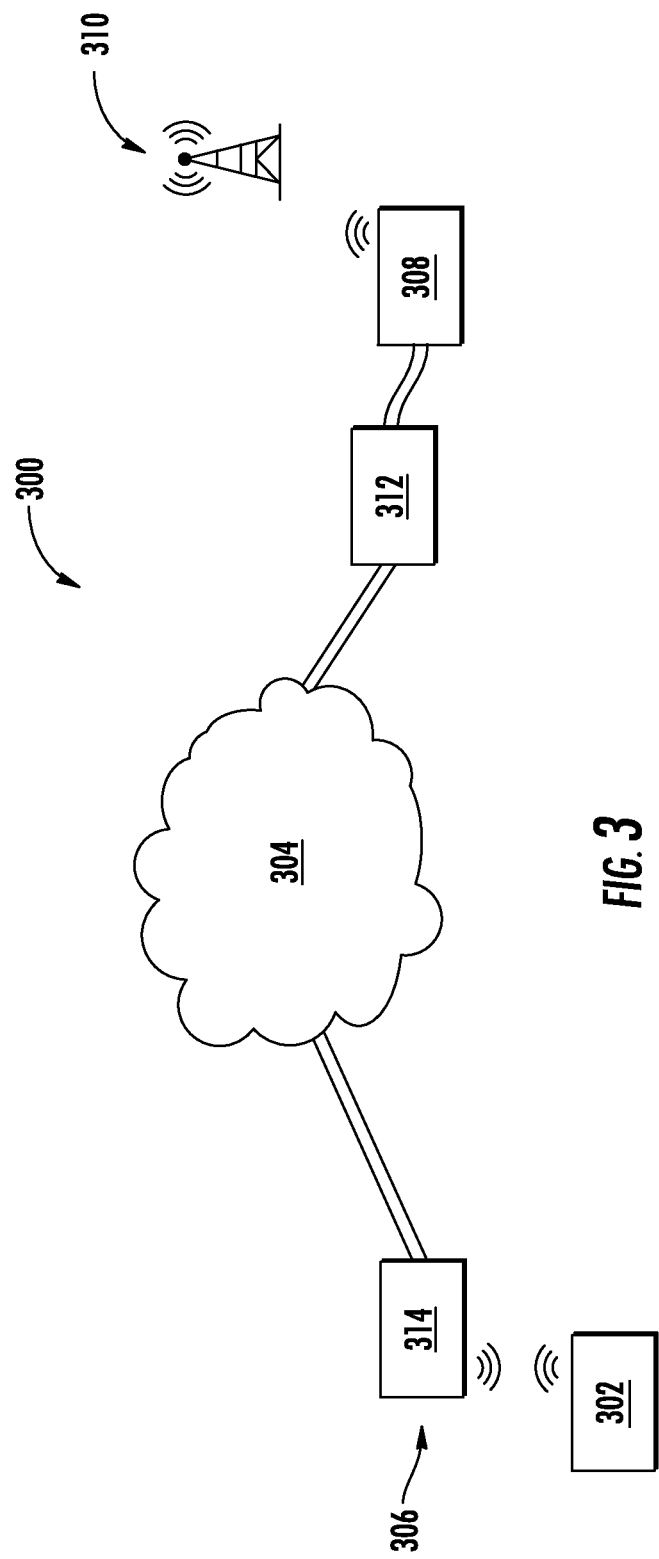
FIG. 3 shows a system in accordance with yet another embodiment.

Referring now to FIG. 3, a system 300 is shown in accordance with one embodiment, wherein system 300 comprises at least one first mobile communications device 302 operative to connect to a global communications network 304 via a local wireless communications network 306, at least one second mobile communications device 308 operative to connect to a mobile communications network 310, and at least one home base station 312 operative to connect to global communications network 304, and to connect to second mobile communications device 308.

In one embodiment, at least one first mobile communications device 302 comprises any type of mobile communications device, such as a mobile phone, a smartphone, a tablet PC, a laptop PC and the like, including but not limited to an international mobile phone. In another embodiment, at least one second mobile communications device 308 comprises any type of mobile communications device, such as a mobile phone, a smartphone, a tablet PC, a laptop PC and the like, including but not limited to a domestic mobile phone.

In some embodiments a user may take first mobile communications device 302 with them on an international trip, while leaving second mobile communications device 308 at home, connected to home base station 312. Accordingly, home base station 312 may be operative to connect to or receive second mobile communications device 308, such as by docking with device 308 or connecting with device 308 wirelessly, such as through Bluetooth® or Wi-Fi, or through a wired connection, such as a USB connection. In a further embodiment, first mobile communications device 302 may be operative to connect to home base station 312 via global communications network 304.

In some embodiments, global communications network may comprise the world-wide-web or the internet. Local wireless communications network 306 may comprise a Wi-Fi network supplied by a WiFi or other wireless network router 314. Home base station 312 and router 314 may be connected to global network 304 via a modem, such as a cable modem, a satellite modem, a GSM modem, a DSL modem, and the like.

In another embodiment, first mobile communications device 302 may be operative to communicate with second mobile communications device 308 via global communications network 304 and home base station 312. In some embodiments, any or all of the features of first mobile communications device 302 may be deactivated (as in restricted or prohibited). This may include calling functions over cellular phone networks, data transfer, and the like. In one embodiment, first mobile communications device 302 may be activated by communicating with second mobile communications device 308. This may be done when the user enters a foreign country.

In yet another embodiment, first mobile communications device 302 may be operative to send or receive communications, such as voice, text, audio-visual, or data communications by connecting to local wireless communications network 306, accessing global communications network 304 via local wireless communications network 306, connecting to home base station 312 via global communications network 304, connecting to second mobile communications device 308 via home base station 312, accessing mobile communications network 310 via mobile communications device 308, and using mobile communications network 310 to send or receive a communication. Mobile communications network 310 may comprise a cellular communications network, such as a GSM or CDMA network. Accordingly, second mobile communications device 308 serves as a proxy to first mobile communications device 302 in accessing or connecting to mobile communications network 310. In a further embodiment, control of second mobile communications device 308 may be remotely controlled through first mobile communications device 302.

In one embodiment, a user of first mobile communications device 302 may be assessed a fee for accessing local wireless communications network 306. In some embodiments, the fee may be assessed by a telecommunications provider, which may be foreign, such as a cellular phone service provider, and the like. Accordingly, the local wireless communications 306 network may be provided by such a telecommunications provider.

In accordance with one embodiment, at least one first mobile communications device 302 may be associated with at least one first telephone number, which may be an international number. In another embodiment, at least one second mobile communications device 302 may be associated with at least one second telephone number, which may be a domestic number.

The various systems and methods described herein may be used to facilitate a user by allowing them to connect their domestic communications device to a home base, and connect to that domestic communications device using an international communications device over a global communications network.

Figure 4:
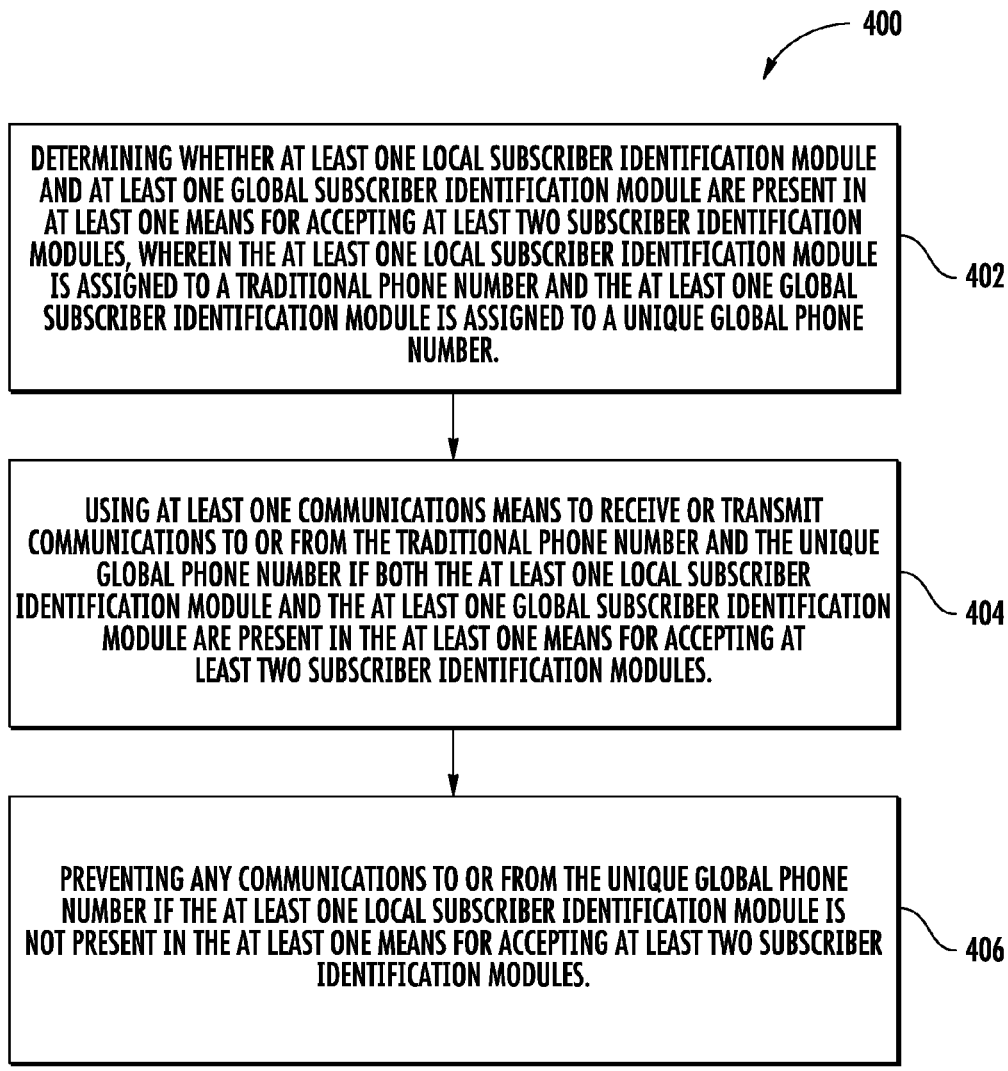
FIG. 4 shows a block diagram depicting a method in accordance with one embodiment.

Referring now to FIG. 4, a block diagram depicting a method 400 is shown in accordance with one embodiment, wherein method 400 may comprise using at least one processor to perform any or all of the following steps: determining whether at least one local subscriber identification module and at least one global subscriber identification module are present in at least one means for accepting at least two subscriber identification modules, wherein the at least one local subscriber identification module is assigned to a traditional phone number and the at least one global subscriber identification module is assigned to a unique global phone number (block 402), using at least one communications means to receive or transmit communications to or from the traditional phone number and the unique global phone number if both the at least one local subscriber identification module and the at least one global subscriber identification module are present in the at least one means for accepting at least two subscriber identification modules (block 404), and preventing any communications to or from the unique global phone number if the at least one local subscriber identification module is not present in the at least one means for accepting at least two subscriber identification modules (block 406).

In some embodiments, the at least one processor may be part of or integrated into a mobile communications device, such as, but not limited to, a smartphone, a mobile phone, a tablet PC, a laptop, and the like.

In some embodiments, using at least one processor comprises using computer executable instructions readable by the at least one processor. In some embodiments, the computer executable instructions may be stored, in whole or in part, remotely, such as on a server or central station, or locally, such as on a local non-transitory (or transitory) computer readable medium, wherein the local storage means may be connected to, part of, or integrated with the at least one processor and/or the mobile device. In some embodiments, the central station may be a cellular telephone/data service provider. The computer executable instructions may take the form of a downloadable application, such as, but not limited to a mobile application.

In some embodiments, a user may be provided with at least one local or global SIM card, as well as access to a downloadable application. In another embodiment, the user may be provided access, or rights to purchase, the downloadable application, and upon purchasing, downloading, or accessing the application, may be provided a local and/or global SIM card.

In some embodiments, method 400 may implement or be a part of the various embodiments of systems and methods described herein, such as those described above with reference to FIGS. 1 through 3.

Figure 5:
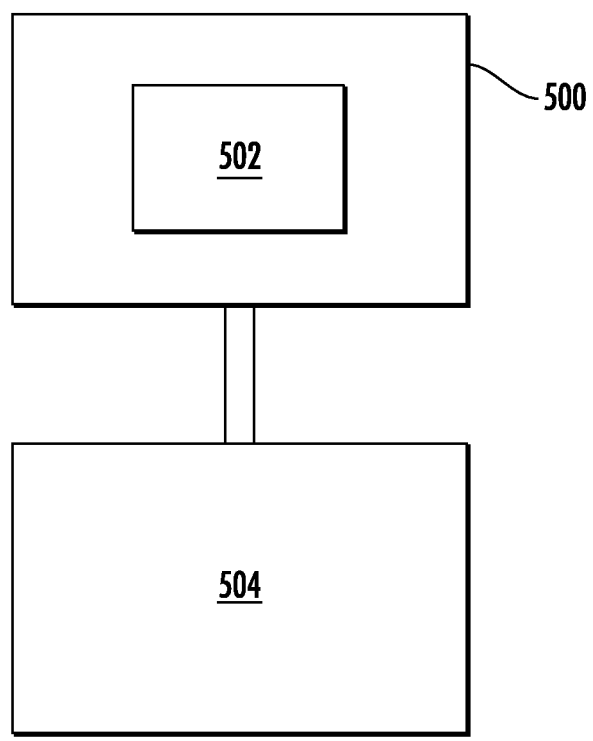
FIG. 5 shows a block diagram depicting a non-transitory computer readable medium in accordance with one embodiment.

Referring now to FIG. 5, a block diagram depicting a non-transitory computer readable medium 500 is shown in accordance with one embodiment, wherein computer readable medium 500 may comprise computer executable instructions 502 readable by at least one processor 504 and operative to perform any or all of the following steps or functions: determining whether at least one local subscriber identification module and at least one global subscriber identification module are present in at least one means for accepting at least two subscriber identification modules, wherein the at least one local subscriber identification module is assigned to a traditional phone number and the at least one global subscriber identification module is assigned to a unique global phone number, using at least one communications means to receive or transmit communications to or from the traditional phone number and the unique global phone number if both the at least one local subscriber identification module and the at least one global subscriber identification module are present in the at least one means for accepting at least two subscriber identification modules, and preventing any communications to or from the unique global phone number if the at least one local subscriber identification module is not present in the at least one means for accepting at least two subscriber identification modules.

In some embodiments, the at least one processor 504 may be part of or integrated into a mobile communications device. In some embodiments, the mobile communications device may comprise a mobile phone, a tablet PC, a smartphone, a laptop, and the like.

In one embodiment, the computer executable instructions 502 may be stored, in whole or in part, remotely, such as in a server or central station, or locally, such as in the mobile communications device. In some embodiments, the central station may comprise any type of central station, such as those described above with reference to FIGS. 1 through 6.

Non-transitory computer readable medium 500 may comprise any type non-transitory computer readable medium, such as, but not limited to, a hard drive, a flash drive, a solid state drive, computer memory, a compact disc, a DVD, and the like. Computer readable medium 500 may comprise any of the various embodiments described herein, such as those described with reference to FIGS. 1 through 6.

In some embodiments, computer executable instructions 502 may comprise the various embodiments of computer executable instructions described herein, such as those described above with reference to FIGS. 1-6. Computer executable instructions 502 may be part of, used in, or be included in the various systems and methods described herein.

Figure 6:
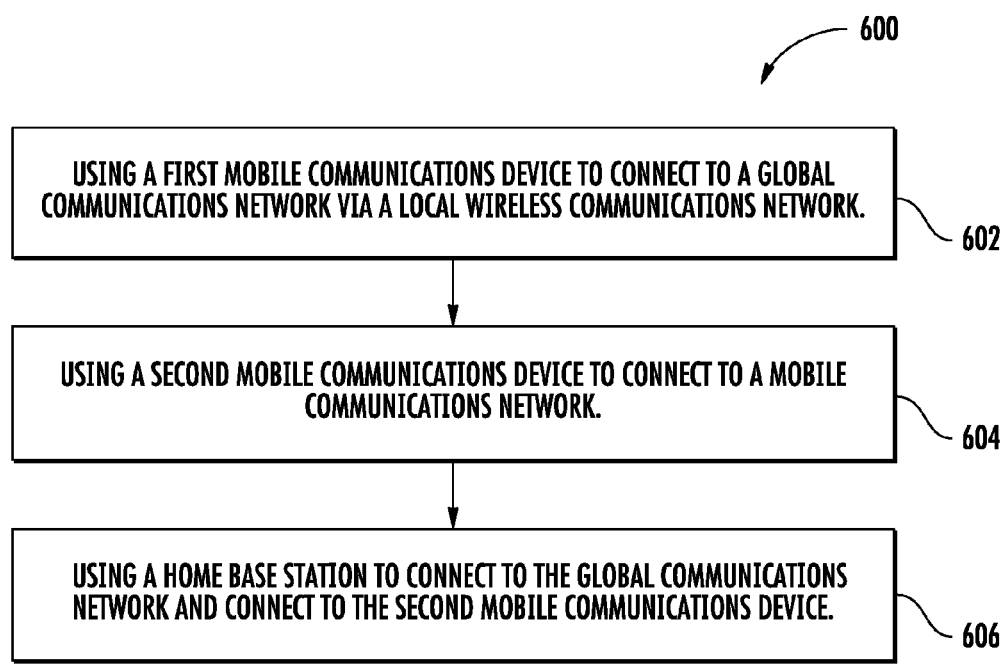
FIG. 6 shows a block diagram depicting a method in accordance with another embodiment.

Referring now to FIG. 6, a block diagram depicting a method 600 is shown in accordance with one embodiment, wherein method 600 using at least one processor to perform any or all of the following: using a first mobile communications device to connect to a global communications network via a local wireless communications network (block 602), using a second mobile communications device to connect to a mobile communications network (block 604), and using a home base station to connect to the global communications network, and connect to the second mobile communications device (block 606).

In some embodiments, the at least one processor may comprise any type of processor, such as those embodiments described throughout the present disclosure.

In another embodiment, the first mobile communications device may comprise at least one international mobile phone, or any other type of mobile communications device, such as those embodiments described throughout the present disclosure.

In another embodiment, the second mobile communications device may comprise at least one domestic mobile phone, or any other type of mobile communications device, such as those embodiments described throughout the present disclosure.

In some embodiments, method 600 may further comprise using the first mobile communications device is to connect to the home base station via the global communications network, which may include or may be carried out by the various steps and embodiments described throughout the present disclosure.

In other embodiments, method 600 may further comprise using the home base station to connect to or transmit or receive information to or from the second mobile communications device, which may include or may be carried out by the various steps and embodiments described throughout the present disclosure.

In other embodiments, method 600 may further comprise using the first mobile communications device to communicate with the second mobile communications device via the global communications network and the home base station, which may include or may be carried out by the various steps and embodiments described throughout the present disclosure.

In yet other embodiments, method 600 may further comprise activating the first mobile communications device when the first mobile communications device communicates with the second mobile communications device, which may include or may be carried out by the various steps and embodiments described throughout the present disclosure.

In some embodiments, method 600 may further comprise using the first mobile communications device to perform any or all of the following: connecting to the local wireless communications network, accessing the global communications network via the local wireless communications network, connecting to the at least one home base station via the global communications network, connecting to the second mobile communications device via the home base station, accessing the mobile communications network via the second mobile communications device, and using the mobile communications network to send or receive a communication, which may include or may be carried out by the various steps and embodiments described throughout the present disclosure.

In some embodiments, method 600 may further comprise assessing a user of the first mobile communications device a fee for accessing the local wireless communications network, may include or may be carried out by the various steps and embodiments described throughout the present disclosure.

In another embodiment, method 600, and any of its various embodiments, may be carried out by computer executable instructions stored on a non-transitory computer readable medium, which may include the various embodiments described throughout the present disclosure The various systems and methods described herein may be used to facilitate a user by allowing them to connect their domestic communications device to a home base, and connect to that domestic communications device using an international communications device over a global communications network.

Hardware and Operating Environment

This section provides an overview of example hardware and the operating environments in conjunction with which embodiments of the inventive subject matter can be implemented. A software program may be launched from a computer readable medium in a computer-based system to execute the functions defined in the software program. Various programming languages may be employed to create software programs designed to implement the system 100 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 2 below.

Figure 2:
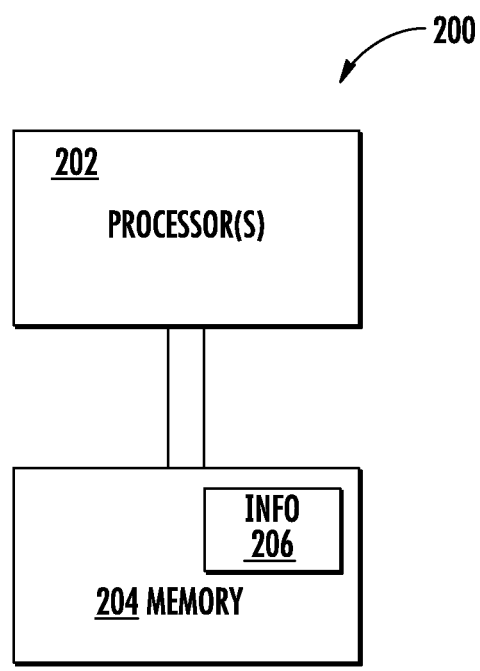
FIG. 2 shows a block diagram representing an apparatus in accordance with one embodiment.

FIG. 2 is a block diagram representing an apparatus 200 according to various embodiments. Such embodiments may comprise a computer, a memory system, a magnetic or optical disk, some other storage device, or any type of electronic device or system. The apparatus 200 may include one or more processor(s) 204 coupled to a machine-accessible medium such as a memory 202 (e.g., a memory including electrical, optical, or electromagnetic elements). The medium may contain associated information 206 (e.g., computer program instructions, data, or both) which, when accessed, results in a machine (e.g., the processor(s) 204) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   at least one first mobile communications device operative to connect to a global communications network via a local wireless communications network;
   at least one second mobile communications device operative to connect to a mobile communications network; and
   at least one home base station located at a user's home, operative to:
   connect to the global communications network;
   and to connect to the at least one second mobile communications device.

2. The system of claim 1, wherein the at least one first mobile communications device comprises at least one international mobile phone.

3. The system of claim 1, wherein the at least one second mobile communications device comprises at least one domestic mobile phone.

4. The system of claim 1, wherein the at least one first mobile communications device is operative to connect to the at least one home base station via the global communications network.

5. The system of claim 1, wherein the at least one home base station is operative to connect to or receive the at least one second mobile communications device.

6. The system of claim 1, wherein the at least one first mobile communications device is operative to communicate with the at least one second mobile communications device via the global communications network and the at least one home base station.

7. The system of claim 1, wherein the at least one first mobile communications device is activated by communicating with the at least one second communications device.

8. The system of claim 1, wherein the at least one first mobile communications device is operative to send or receive communications by:
   connecting to the local wireless communications network;
   accessing the global communications network via the local wireless communications network;
   connecting to the at least one home base station via the global communications network;
   connecting to the at least one second mobile communications device via the at least one home base station;
   accessing the mobile communications network via the at least one second mobile communications device; and
   using the mobile communications network to send or receive a communication.

9. The system of claim 1, wherein a user of the first mobile communications device is assessed a fee for accessing the local wireless communications network.

10. The system of claim 9, wherein the fee is assessed by a foreign telecommunications provider.

11. The system of claim 1, wherein the at least one first mobile communications device is associated with at least one first telephone number.

12. The system of claim 1, wherein the at least one second mobile communications device is associated with at least one second telephone number.

13. A method comprising:
   using at least one processor to perform any or all of the following:
      using a first mobile communications device to connect to a global communications network via a local wireless communications network;
      using a second mobile communications device to connect to a mobile communications network, and
      using a home base station, located at a user's home to:
   connect to the global communications network; and
   connect to the second mobile communications device.

14. The method of claim 13, wherein the first mobile communications device comprises at least one international mobile phone.

15. The method of claim 13, wherein the second mobile communications device comprises at least one domestic mobile phone.

16. The method of claim 13, further comprising using the first mobile communications device is to connect to the home base station via the global communications network.

17. The method of claim 13, further comprising using the home base station to connect to or transmit or receive information to or from the second mobile communications device.

18. The method of claim 13, further comprising using the first mobile communications device to communicate with the second mobile communications device via the global communications network and the home base station.

19. The method of claim 13, further comprising activating the first mobile communications device when the first mobile communications device communicates with the second mobile communications device.

20. The method of claim 13, further comprising using the first mobile communications device to perform any or all of the following:
   connecting to the local wireless communications network;
   accessing the global communications network via the local wireless communications network;
   connecting to the at least one home base station via the global communications network;
   connecting to the second mobile communications device via the home base station;
   accessing the mobile communications network via the second mobile communications device; and
   using the mobile communications network to send or receive a communication.

21. The method of claim 13, further comprising assessing a user of the first mobile communications device a fee for accessing the local wireless communications network.

22. A non-transitory computer readable medium comprising:
   computer executable instructions readable by at least one processor and operative to perform any or all of the following steps or functions:
   using a first mobile communications device to connect to a global communications network via a local wireless communications network;
   using a second mobile communications device to connect to a mobile communications network, and
   using a home base station, located at a user's home to:
   connect to the global communications network; and
   connect to the second mobile communications device.

* * * * *